US012711850B2

(12) United States Patent
Thevathasan et al.

(10) Patent No.: US 12,711,850 B2
(45) Date of Patent: Aug. 18, 2026

(54) ELECTRONIC MONITORING (EM) GPS DECISION AID

(71) Applicant: The University of Chicago, Chicago, IL (US)

(72) Inventors: Benjamin Thevathasan, Chicago, IL (US); Steven Levitt, Chicago, IL (US); Jeffrey Severts, Hinsdale, IL (US)

(73) Assignee: The University of Chicago, Chicago, IL (US)

( * ) Notice: Subject to any disclaimer, the term of this patent is extended or adjusted under 35 U.S.C. 154(b) by 82 days.

(21) Appl. No.: 18/768,399

(22) Filed: Jul. 10, 2024

(65) Prior Publication Data

US 2025/0022359 A1 Jan. 16, 2025

Related U.S. Application Data

(60) Provisional application No. 63/525,839, filed on Jul. 10, 2023.

(51) Int. Cl.
*G08B 21/18* (2006.01)

(52) U.S. Cl.
CPC .................................. *G08B 21/182* (2013.01)

(58) Field of Classification Search
CPC .................................................... G08B 21/182
USPC .......................................................... 340/540
See application file for complete search history.

(56) References Cited

U.S. PATENT DOCUMENTS

| | | | | |
|---|---|---|---|---|
| 9,503,873 | B1 * | 11/2016 | Yadav | H04W 4/90 |
| 10,142,213 | B1 * | 11/2018 | Hart | H04L 67/52 |
| 11,393,319 | B1 * | 7/2022 | Maisano, II | G08B 25/005 |
| 2003/0210147 | A1 * | 11/2003 | Humbard | G08B 21/22<br>340/573.4 |
| 2007/0229290 | A1 * | 10/2007 | Kahn | G16H 50/80<br>702/19 |
| 2009/0119119 | A1 * | 5/2009 | Scalisi | G06Q 10/0833<br>705/333 |
| 2014/0118140 | A1 * | 5/2014 | Amis | G08B 25/08<br>340/539.13 |
| 2014/0139335 | A1 * | 5/2014 | Vallaire | G08B 27/00<br>340/539.13 |
| 2014/0306802 | A1 * | 10/2014 | Hibbs, Jr. | G08B 25/12<br>340/7.58 |
| 2016/0134644 | A1 * | 5/2016 | Chan | H04L 67/52<br>726/22 |
| 2020/0094092 | A1 * | 3/2020 | Skaaksrud | G01N 33/004 |
| 2020/0389551 | A1 * | 12/2020 | Vaughn | H04M 3/42059 |
| 2020/0404476 | A1 * | 12/2020 | Sweet | H04W 8/26 |
| 2021/0084436 | A1 * | 3/2021 | Sutherland | H04L 63/0853 |
| 2025/0022359 | A1 * | 1/2025 | Thevathasan | G08B 21/182 |

* cited by examiner

*Primary Examiner* — Zhen Y Wu
(74) *Attorney, Agent, or Firm* — Foley Hoag LLP; Erik A. Huestis; Alexander Akhiezer

(57) ABSTRACT

Systems and methods are disclosed for electronic monitoring. A method of electronic monitoring comprises receiving a location of a participant, receiving data associated with the participant, and determining an alert level for the participant based on the data and the location of the participant.

21 Claims, 6 Drawing Sheets

100

200

300

| *Priority Level* | *General Priority Description* | *Recommended Action* |
|---|---|---|
| **High** | Possible Public Safety Impact | Investigate immediately |
| **Medium** | Possible Non-Compliance | Investigate at your discretion |
| **Low** | Extensive Compliance | Investigation not recommended |

Figure 3

400

| *Alert Type* | *Summary* | *Priority Levels* |
|---|---|---|
| **AWOL Risk** | Participant is either already AWOL or at risk of becoming AWOL (e.g. strap tamper, dead battery) | High, Medium |
| **Proximity** (to Crime / Special Locations) | Participant was near crime reported, or other locations (or people) of special interest | High, Medium |
| **Curfew** (Unscheduled Movement) | Participant had no scheduled & approved movement but moved anyway | High, Medium |
| **Incorrect Location** (Scheduled Movement) | Participant had scheduled & approved movement but moved outside approved zones | High, Medium |
| **Within Home Geofence** | Participant triggered RF alert but is very close to home | Low |

Figure 4

ELECTRONIC MONITORING (EM) GPS DECISION AID

RELATED APPLICATION(S)

This application claims the benefit of priority to U.S. Provisional Application No. 63/525,839, filed Jul. 10, 2023, which is incorporated herein by reference in its entirety.

TECHNICAL FIELD

The invention relates generally to electronic modeling, and, in particular, to systems and methods for software applications for electronic monitoring agencies.

BACKGROUND

Electronic Monitoring ("EM") as it is currently practiced is not manageable at scale—a problem given that the number of monitored individuals on EM has more than doubled in 10 years. Monitored individuals ("participants") can lead complex lives that require movement for work, school, court, attorney/doctor visits, and myriad other reasons. To handle this complexity, monitoring agencies are increasingly moving from high-touch, labor-intensive solutions that involve frequent home visits and hands-on case management to low-touch, digital approaches that rely on software applications and the efficient processing of data.

Unfortunately, current software solutions do not effectively facilitate the smooth, complex management of participants in large EM programs. They are woefully ineffective at detecting true, socially costly infractions, and instead inundate monitoring agencies with nuisance alerts that are trivial, non-actionable, or in many cases false positives. These "false alerts" penalize minor technical infractions and do not identify serious criminal involvement.

Furthermore, alerts are often poorly prioritized, with no regard for the seriousness of the infraction or the monitored individual's behavioral history. Finally, their algorithms are often untested in the real world, with no measure of ground truth to validate or fine-tune their parameters.

All these deficiencies cause monitoring agencies to waste precious resources, imperil public safety, and subject some monitored individuals to seemingly capricious interventions in their lives. The present disclosure describes a software application that functions as a decision aid for monitoring agencies and facilitating superior management of EM participants.

SUMMARY

According to certain aspects of the present disclosure, systems and methods are disclosed for managing and tracking EM participants.

In some embodiments, a method comprises receiving a location of a participant, receiving data associated with the location of the participant, and determining an alert level for the participant based on the data and location of the participant.

In some embodiments, the method further comprises generating an alert for the participant whose alert is above a threshold level.

In some embodiments, the method further comprises receiving a set of participant characteristics, the set comprising at least one authorized location, at least one unauthorized location, and a schedule, and adjusting the alert level based on the set of participant characteristics, and transmitting the adjusted alert level to the user.

In some embodiments, the at least one authorized location is a home address.

In some embodiments, the schedule is a preapproved day-to-day schedule.

In some embodiments, the location of the participant is a global position system (GPS) location or a radio-frequency (RF) location.

In some embodiments, the method further comprises generating a map of the location of the participant and a representation of the data associated with the location of the participant.

In some embodiments, the representation of the data comprises one or more of an indication of at least one of a location of a crime scene, an area of public safety interest, and a location of a reported shot fired.

In some embodiments, the method further comprises receiving demographic data associated with the participant and displaying a representation of the demographic data on the map.

In some embodiments, the map comprises an inclusion zone associated with the participant.

In some embodiments, the method further comprises receiving a contact history for the participant, adjusting the alert level based on the contact history, and prompting the user to contact the participant based on the adjusted alert level.

In some embodiments, the data associated with the location of the participant comprises one or more of local crime data, reported shots fired, and historical crime data.

In some embodiments, the method further comprises receiving a start point and an end point for the participant, generating a trip from the start point to the end point for the participant, based on the location of the participant, determining a deviation of the participant from the trip, and adjusting the alert level based on the deviation of the participant.

In some embodiments, the method further comprises receiving an alert level history for the participant, and transmitting the alert level history to the user.

In some embodiments, the alert level history includes a resolution log associated with the participant. In some embodiments, the resolution log includes one or more alert details and a resolution associated with the one or more alert details. In some embodiments, the one or more alert details comprise an alert type.

In some embodiments, the method further comprises based on the alert level of the participant, determining a priority level for the participant, and ranking the participant based on the priority level.

In some embodiments, the method further comprises receiving information associated with the participant, based on the information associated with the participant, determining the threshold level.

In some embodiments, the alert level is one of low, medium, or high.

In some embodiments, a system comprises a computing node comprising a computer readable storage medium having program instructions embodied therewith, the program instructions executable by a processor of the computing node to cause the processor to perform a method comprising receiving a location of a participant, receiving data associated with the location of the participant, and determining an alert level for the participant based on the data and location of the participant.

In some embodiments, a computer program product, comprising a computer readable storage medium having program instructions embodied therewith, the program instructions executable by a processor to cause the processor to perform a method comprising receiving information associated with the participant, based on the information associated with the participant, determining the threshold level.

BRIEF DESCRIPTION OF THE DRAWINGS

The accompanying drawings, which are incorporated into and constitute a part of this specification, illustrate various exemplary embodiments and together with the description, serve to explain the principles of the disclosed embodiments.

FIG. 3 is a table illustrating exemplary alert types, according to embodiments of the present disclosure.

FIG. 4 is a table summarizing different alert types, according to embodiments of the present disclosure.

DETAILED DESCRIPTION

Figure 1:
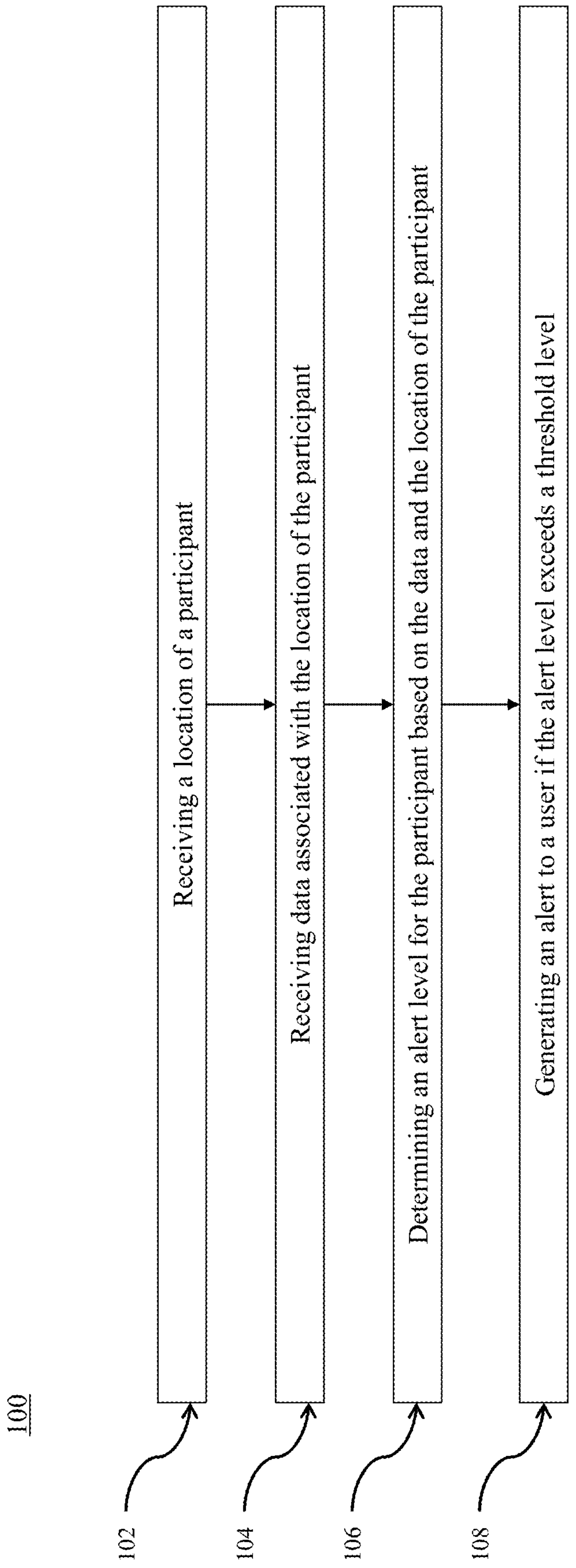
FIG. 1 is an exemplary method of managing and tracking EM participants, according to embodiments of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

The present disclosure describes a software application that functions as a decision aid for monitoring agencies, facilitating superior management of EM participants through: (1) smarter alert algorithms incorporating unique sources of information; (2) prioritization of participants for investigation in real-time; (3) a management dashboard to better inform monitoring agency executives; and (4) automated trip planning for participants.

Smarter Alert Algorithms

Embodiments of the present disclosure include a decision aid application that integrates data from disparate sources to produce a suite of alerts that allow a monitoring agency to better assess the critical threats to public safety.

Embodiments of the present disclosure include a class of proximity alerts integrating datasets from local police units on crime incidents, shots fired, and other crime-related data sources like 911 calls to identify participants in close proximity. These alerts aim to identify possible participant involvement in new crimes, not only as possible perpetrators, but also as possible victims requiring emergency attention. These alerts do not compare participant GPS traces to incoming public safety incidents.

The proximity alerts as described in the present disclosure are automated, able to produce alerts with minimal latency (i.e., in real-time), and integrate other smart criteria whose parameters have been fine-tuned through simulations and validated against ground truth data. These smart criteria integrate other data sources to try and reduce the volume of nuisance alerts that does not actually track offender misbehavior. For example, the whereabouts and approved locations of EM participants along with crime and shot incidents can be integrated from multiple criminal justice databases.

Through a series of heuristics-based algorithms co-developed with correctional staff, some embodiments of the present disclosure create a reliable set of alerts that identify serious potential infractions, including potential involvement in violent crime, and prioritizes EM participants accordingly. Some embodiments remove noise associated with GPS phenomena and recategorizes >75% of the default vendor technical violations as 'non-actionable' or potentially 'false positives', encouraging their rapid dismissal for the sake of both staff efficiency and participant experience in favor of focus on more serious infractions. It presents these alerts in a front-end in tables and maps that allow for quick high-level views as well as more comprehensive deep dives into particular participant locations. Key static locations that can give rise to alerts include hospitals, gun shops, etc.

Embodiments of the present disclosure also present device alerts that aim to capture another category of serious infractions: tampering with the device in order to remove it or impede its functionality. These include alerts that flag: (a) devices that appear to be physically removed from the participant; (b) devices whose battery has died; (c) devices that have not produced a GPS position in a defined period of time; (d) devices that show signs of being wrapped in aluminum foil or other Faraday cage-like materials to interfere with their transmission and reception of signals. Embodiments of the present disclosure build on existing technology that attempts to distinguish signal loss induced by deliberate tampering from benign signal loss (e.g., due to environmental conditions. Better performance metrics are incorporated into the mode making use of ground truth collection experiments. In some embodiments, interpolations are made when a signal cuts out but the participant is in the same location (i.e., trace before and after is in the same place).

In some embodiments, alerts can be accompanied with an AWOL Risk designation that incorporates additional information (like where the alert occurred) to indicate an increased likelihood of participants attempting to escape the program, while deprioritizing alerts that are more likely to be the product of faulty equipment.

In some embodiments, location alerts can flag infractions that violate participants' movement rules, but assess and sort infractions based on the estimated risks to public safety. In some embodiments, a loitering algorithm is able to flag participants who loiter in an unauthorized area for specified periods of time (which can be customized by the monitoring agency according to perceived participant risk). This loitering algorithm creates real-time alerts when participants spend more than L (15-720) minutes around an unapproved area. Variable loitering thresholds allow agencies to choose from predetermined thresholds (such as 45, 60, 120 minutes, etc.) and assign them to individuals with lower risk levels or fewer violations.

In some embodiments, a curfew alert flags unauthorized leaves from home (after incorporating a grace period), but uniquely and automatically suppresses itself if the participant arrives at an authorized location (e.g., a hospital, a courthouse, an addiction treatment facility, etc.).

Crucially, alerts are produced in real-time, immediately after a participant has crossed the time threshold for loitering, or been in proximity to a shot fired, or detached their device. This allows for rapid response by monitoring agencies.

Prioritization of Participants for Investigation in Real-Time

The decision aid application incorporates a weighted linear model that incorporates various participant alerts and other observed behaviors to rank participants by the urgency of their current situation and need for investigation by the monitoring agencies. Other known approaches use the first-in-first-out/chronological approach. The model incorporates both the seriousness and the recency of the infraction. The heaviest weights in the model include recent proximity alerts and AWOL risk, reflecting the seriousness of potential criminal involvement and escape from EM. The model is constantly recalculating priority scores for participants with the creation and termination/suppression of alerts or new data.

Management Dashboard for Monitoring Agency Executives

In some embodiments, usage statistics and program KPIs are incorporated into a separate tab of the decision aid application. These metrics are primarily for executive review and include details on usage (who are prolific users of the decision aid), alert responsiveness (how many and how quickly alerts are being handled), population size & detail (what proportion have movement/are generating alerts), etc. This dashboard can help executives understand the monitoring effectiveness of their agencies and allow them to re-allocate resources as necessary.

In some embodiments, usage statistics and program KPIs can be developed and incorporated into a separate tab of the decision aid. These metrics can be primarily for executive consumption and include details on usage (who are prolific users of the Decision Aid), alert responsiveness (how many and how quickly alerts are being handled), population size and detail (what proportion have movement/are generating alerts), etc.

Automated Trip Planning

To dramatically reduce the administrative load for monitoring agencies, some embodiments of the decision aid automate the approval and monitoring process for participants to attend social service agencies and other sources of support. Currently, participants must call in or submit paperwork for approval to visit social support services (e.g., drug addiction counseling, career counseling, etc.). This process consumes precious resources at the monitoring agencies and discourages participants from seeking the help they need.

The decision aid automatically allows participants to visit these services as long as the vendor has been pre-approved by the monitoring agency. The application only flags a participant visiting these agencies if they exhibit other, high-public-safety-risk behaviors (e.g., loitering, taking indirect routes, etc.).

In some embodiments, the model receives a schedule and address that a participant needs to be at (e.g., for a job interview, court visit, etc.). In response, the application can prompt the participant to leave at particular times and along particular routes to get to destination, with minimal planning on the participant's part. Conditional on frequent unscheduled participant visits to approved location, automated movement requests can be generated and sent to participant's case manager for approval or notification.

If a participant makes several unplanned trips to a service provider, the decision aid can automatically inform a case manager at the monitoring agency so that they can follow up with additional offers of assistance.

User Input and Alert Resolution

In some embodiments, the application includes a user interface that presents information in a focused, streamlined manner that calls attention to the pertinent details and eliminates extraneous data. If an alert is deemed "false", the user can be scrubbed from the participant's record. If the alert results in a contact made with the participant, the alert is removed from the user's view but still counts towards a participant's prioritization.

In some embodiments, the application interface allows users to input information and modify and/or resolve alerts. Users can record information about whether the alert was actionable or participant was at fault or otherwise involved in the alert (e.g., the participant was victimized in a shooting or crime alert). Users can also add loitering addresses/areas to list of approved addresses, so subsequent visits to the area will not generate an alert.

Use Cases

The following examples serve to illustrate embodiments of the application.

After logging in, a user lands on a home page of the application comprising, for example, a Table of All Participants. The home page can contain up-to-date data associated with the location of the participant, including but not limited to (a) participants in a GPS program; (b) all alerts, current and historical, the participants have triggered, according to customized RISC algorithms; (c) accompanying details (e.g., indicator for a gun charge, administrative high priority status, time of last alert, indicator for whether a participant has had an unresolved alert); and (d) ordering of personnel by priority according to a default prioritization scheme set by customized algorithms.

The user can filter and sort participants, alerts, and details by a combination of different table columns, with a default ordering returned to upon a page refresh. In some embodiments, recently deactivated participants can be included as greyed out names or at the bottom of the list.

In some embodiments, details in the Table of All Participants includes an arrest or hospital status. In further embodiments, a start date is included for each participant.

Users can receive notifications from the application that indicates new alerts updated in real-time, optionally linking to a participant's current position (which can be displayed as Current Participant Position). The user can receive notifications on any page they are currently viewing so long as they remain logged in.

In some embodiments, users can subscribe to particular notifications only (e.g., CPD users may only subscribe to Crime Match notifications).

Upon entering the Current Participant Position, the application displays a map centered around the participant's last-known position, updated in real-time, indicated by a pulsing indicator with an arrow marker pointing in the direction of the participant's movement. It should be noted that the term "position" can be used interchangeably with the term "location". In some embodiments, the application displays a Current Participant position. In some embodiments, the application displays a participant location when the historical alert occurred. In some embodiments, the pulsing indicator can be colored green if the participant's position is not associated with a customized alert, and colored red if the participant's position is associated with a customized alert. The indicator can be updated in real-time as the participant's position updates, changing color as necessary. A previously pulsing indicator can, for example, turn into a lower opacity arrow marker. If a last known position is more than 5 minutes old, a text box highlighting this lag can pop up above the pulsating indictor.

The user can observe, on the Current Participant Position page, all participant's previous positions since the position has last left a home address, which can be indicated in a lower opacity with arrow markers pointing in the direction of participant's movement at the time of leaving the home address. All markers are colored green if the position is not associated with a customized alert; if the position is associated with a customized alert, the marker is colored red. The user can click on any position for an associated timestamp, address, places at the address (e.g., businesses pulled from Google), nature of alert (e.g., curfew, loiter), authorization (e.g., home, work, court), and other details.

In some embodiments, the user can also observe icons on the map that indicate a participant's home address, other authorized address (e.g., work), unauthorized addresses participant loitered at, and any crime or short reports in proximity of participant. These can be indicated using different icon types (e.g., a house icon for a home address, an exclamation mark for crimes/loiters).

Users can also navigate the application via a sidebar in Current Participant Position, and via clicking links, to (a) call participant via an associated phone number; (b) resolve the alert via an Alert Resolution Box; (c) access participants' Historical Alert Maps that contain similar maps to Current Participant Position but for alerts in the past; (d) access participants' Individual Alert Table that provides a summary view of all of a participant's historical alerts; and (e) return to the Table of All Participants.

In some embodiments, the user can select an Alert Resolution Box, which prompts the user to provide a Yes/No response to the following exemplary questions: "False Alarm?", "Participant Contacted?", "Participant Given Warning?" (if the answer to "False Alarm?" is "No"), "Participant requires dispatch?" (if the answer to "False Alarm?" is "No"), and "Participant requires re-incarceration?" (if the answer to "False Alarm?" is "No"). User can also be prompted to enter free text into a "Case Notes" field. Details regarding warnings issued to the participant, such as if the warning was verbal or written, or regarding situational circumstances, can also pop up when the Yes/No answer is provided by the user. Questions can be added or removed easily after deployment by super-users. A set of pre-defined super-users can extend super-user privileges to others. A super-user account is one with administrative permissions, including but not limited to adding and deleting users and viewing overall statistics not accessible to regular (i.e., non-super-user) users.

Superusers are users able to access a Summary Statistics/KPI page as their home landing page, where the page comprises: (a) number of alerts by date generated; (b)

number of alerts by date resolved; (c) number of alerts resolved by user, in some embodiments this is shown as a rolling average by the date resolved; and (d) average lag between date generated and date resolved, which is sown in some embodiments as a rolling average by date resolved.

In some embodiments, a user can select Historical Alert Maps, displaying the most recent alert map (excluding any current alert, which is shown under Current Participant Position) containing all participants between a departure from and return to the participant's home address that book-end an alert position, with arrows markers as per Current Participant Position. In the Historical Alert Maps, a user can interact with an animated feature in a corner of the page that plays, rewinds, fast forwards, or otherwise interacts with a slider of the participant's position. In some embodiments, animation can trigger a pulsing indicator over cued arrow markers, which allow users to observe a playback of the participant's movement. Animation can also allow for a modified speed of playback, which can default to ~2 positions per second in some embodiments. Also within the Historical Alert Maps display, the user can navigate through all entries of the Alert Resolution Box that have been submitted for a particular alert. The user can read through such alert details as whether the participant had scheduled movement during the time of the alert and where the participant loitered, as applicable.

In some embodiments, the user can navigate through all entries from an external vendor data note feed within Historical Alert Maps. The external vendor data note feed may include user notes, inputted messages regarding a particular participant or case file, etc. In some embodiments, the user can select previous and next alert maps in a sidebar of the Historical Alert Maps page to cycle through a history of the participant's alert in a reverse chronological order.

The user can select an Individual Alert Table in the sidebar of the Historical Alert Maps to browse an entire history of the participant's alerts. The history can include: (a) home departure and return times that book-end alert positions; (b) alert type and details (e.g., curfew, loiter, whether the participant had scheduled movement or not); and (c) aggregated responses to Alert Resolution Box. Individual Alert Table can also indicate whether a participant has gone absent without leave (AWOL).

In some embodiments, the user can read through individual-level features of the participant in the Individual Alert Table, including gun charge indicator. To access these details, the user first selects Current Participant Position to then select Individual Alert Table. In some embodiments, these details are available by selecting the participant's name from the Current Participant Position. In some embodiments, the user can navigate through all entries from the Protocol logs feed in the Individual Alert Tables.

The application can include a Movement Permissions page, which details locations where participants are authorized to travel. In some embodiments, the user can navigate to the Movement Permissions page from any of the individual-level pages. In further embodiments, users can check days of the week, or specific dates, that the user is allowed to be travelling out of his Home address. Upon selecting a date, the user is prompted to estimate hours of the day (in, for example, 30 minute increments) or associate addresses from an Approved Addresses List, but these associations are not required for approved movement days/dates. The Movement Permissions page can also obtain approved movement addresses and times from external data sources where necessary (e.g., external vendors' APIs).

Once a modification is made in the Movement Permissions page, the relevant individual's customized alerts can, with minimal latency, incorporate the updated data and auto-resolve if necessary, with an automated entry in the Alert Resolution Box.

While it is contemplated that the software is presented on a computer, such as through an internet browser, some embodiments of the present disclosure can be optimized for a mobile device web page or an application. In particular, the Current Participant Position page, notification elements, and the animation features. A user can log into the website or application using an SSO authentication in harmony with other organization platforms, where necessary.

In some embodiments, automated reports are created for each participant or for each alert. For example, a weekly report can be prepared for a participant as a deterrence or as a part of case management. An automated text message can be sent to report each alert to participants. For cases of incorrect geocodes resulting in incorrect location reporting for participants, an automated home coordinate reset can be implemented. An incorrect geocode can result if an address is misspelled, incomplete, or simply incorrect, or if a geocoded point is too far from an actual participant's home (this especially is the case for large housing complexes, caravan parks, etc.).

FIG. 1 is an exemplary method 100 for alerting a user to a participant's alert level, when the alert level has exceeded a threshold value. The exemplary method 100 (i.e., steps 102-108) can be performed by server systems based on information, images, and data received by the system over the electronic network. The method 100 can be performed automatically or in response to an input from a user. The method can be performed as discrete steps in a predetermined temporal sequence (e.g. each step completed before commencing the subsequent step), and/or in some embodiments at least some steps can partially overlap (e.g. each step need not be completed before commencing the subsequent step). The method is generally described below:

Receiving a location of a participant (step 102);

Receiving data associated with the location of the participant (step 104);

Determining an alert level for the participant based on the data and the location of the participant (step 106);

Generating an alert to a user if the alert level exceeds a threshold level (step 108).

Figure 2:
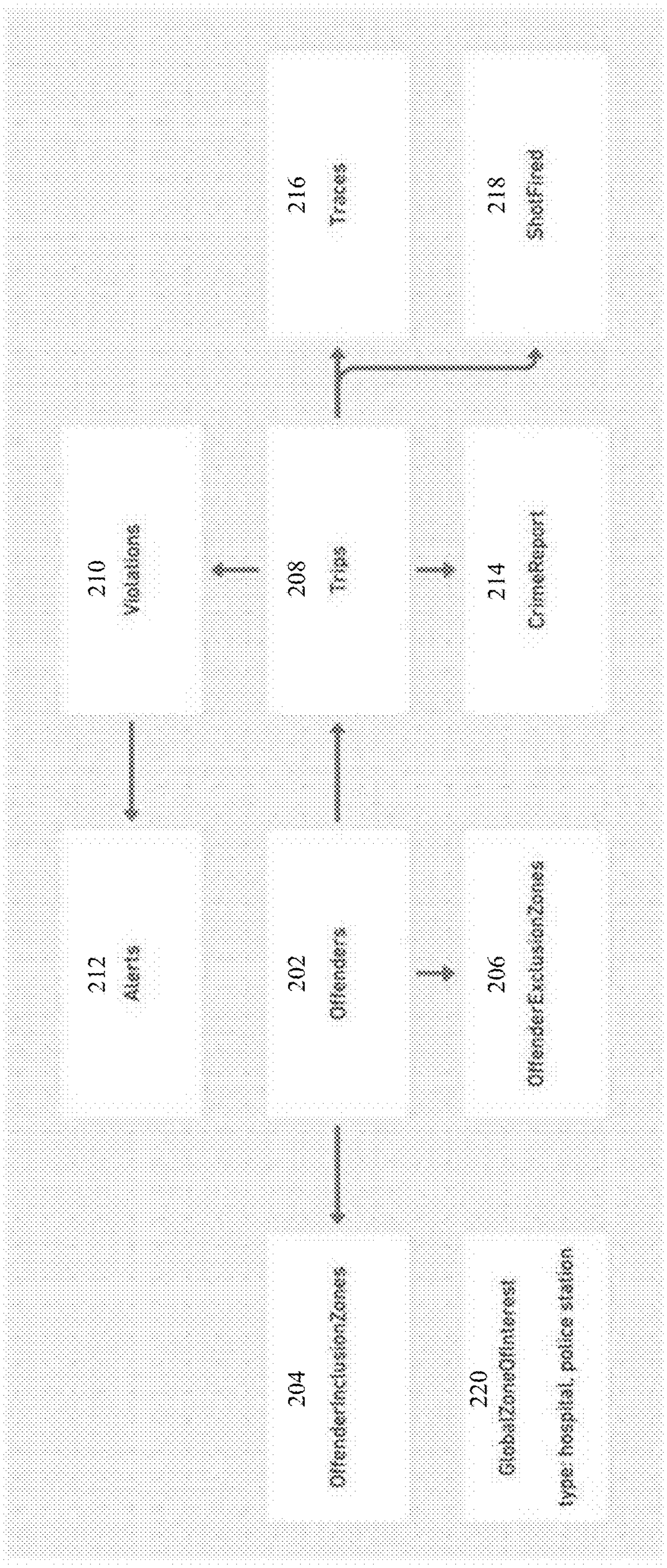
FIG. 2 is an exemplary database structure, according to embodiments of the present disclosure.

FIG. 2 illustrates an exemplary database structure 200. The user of the database can select an Offender 202 from a collection of offenders (i.e., the Table of All Participants in some embodiments). Each Offender 202 is associated with one or more OffenderInclusionZones 204, one or more OffenderExclusionZones 206, and one or more Trips 208. Each trip of the one or more Trips 208 belongs to an Offender 202, and has a number of Traces 216 and Violations 210, as well as a start and end time for each trip. Through the one or more Trips 208, the Offender 202 is associated with one or more Traces 216, as well as one or more Violations 210. Through the one or more Violations 210, the Offender 202 can have many Alerts 212. Each alert of the Alerts 212 belongs to a corresponding trip of the one or more Trips 208. Each alert has a specified type, such as a loitering alert, a curfew trip alert, etc., and includes a start time and an end time of the alert. For each of the Traces 216, the individual trace belongs to one of the Trips 208; if the trace is not correlated with a trip, the trace is discarded. Each of the Traces 216 includes a longitude and a latitude, as well as a date and time associate with the trace. A confidence is included with each of the Traces 216, indicating a degree of certainty of the trace.

Each of Trips 208 can also include a CrimeReport 214. The CrimeReport 214 includes a number of trips, as well as the latitude, longitude, and date/time information pertaining to the crime as reported. Similarly, a ShotFired 218 indicator can include a number of trips, the latitude, longitude, and date/time information for an event where shots have been reported. In some embodiments, ShotFired correlates to reported shots. In alternate embodiments, ShotFired correlates to confirmed shots. In some embodiments, ShotFired correlates to both reported and confirmed shots.

The trace function can be activated before a save occurs. If the Offender 202 is outside of one of the OffenderInclusionZones 204, a correlated trip is found from the Offender 202's details or created. The trip is then associated to the Offender 202, and a trace is associated with the trip. If the Offender 202 is not outside of one of the OffenderInclusionZones 204, the trace is discarded. A trace is processed by the trip function to associate the trace with previous trips (if applicable), create a new trip, or put the participant at "home".

Similarly, if the ShotFired 218 is activated before a save occurs, the program can check for Traces 216 within a geographic or chronological threshold. If such a trace is found, the trace is associated with a trip, and a violation check is run. Likewise, if the CrimeReport 218 is activated before a save occurs, the program can check for Traces 216 within a geographic or chronological threshold. If such a trace is found, the trace is associated with a trip, and a violation check is run.

A trip function can be activated after a save has occurred. In this embodiment, a check is made for a curfew violation, a loiter violation, an exclusion zone violation, a shooting violation, and/or a crime violation.

FIG. 3 is a table 300 illustrating different priority levels and accompanying information, according to embodiments of the present disclosure. The priory levels include high, medium, and low. High priority alerts are defined conservatively; this priority level triggers straightforward alerts that staffers can agree require immediate response. The general priority description of the high priority level is associated with a possible public safety impact, and a recommended action of investigating immediately. For medium priority levels, the associated general priority description is possible non-compliance of the participant, and it is recommended to investigate at the user's discretion. For low priority levels, the associated general priority description is extensive compliance, with no investigation recommended. Additional prioritization will depend on patterns of behavior/alert history, but EM staff can have the ability to sort by and select different options.

FIG. 4 is a table 400 summarizing different alert types, according to embodiments of the present disclosure. Exemplary alert types include AWOL Risk, where the participant is already AWOL or at risk of becoming AWOL (e.g., strap tamper, dead battery) and the priority level is high or medium. If the alert regards a device being tampered with, the application forwards any tampering information and adds any additional filters if needed (e.g., multiple prolonged tampers, or tampers followed by no movement detected). If the alert relates to a dying device battery, the user can choose to filter out "Low Battery" alerts and only forward "Sleep Mode" alerts and "Battery Critical" alerts. Additional, Prolonged Signal Loss (where there is zero location signal for greater than X [2-48] hours) alerts are considered AWOL Risk alert types. The AWOL Risk alert type requires immediate mandatory action, and the decision aid application helps to function as a back-up to ensure alerts do not fall through the cracks. Further alert types are Proximity (to Crime/Special Locations) alerts, where the participant was near a crime reported, or other locations (or people) of special interest and the priority level is high or medium; Curfew (Unscheduled Movement), where the participant had no scheduled and approved movement but moved anyway and the priority level is high or medium; Incorrect Location (Scheduled Movement) where the participant had scheduled and approved movement but moved outside approved zones and the priority is high or medium; and Within Home Geofence, where the participant triggered an RF alert but is very close to home, and the priority level is low.

For Proximity to Crime alerts, device data is cross-referenced with crime data from public safety datasets (e.g., CPD's CLEAR and Shotspotter) to generate a list of EM participants who might have information on crimes. Crimes can be narrowed down to "private" crimes-those that a person in proximity to the crime would likely know something about the crime (i.e., motor vehicle theft, not pick-pocketing). To minimize false positives, instances where the participant is at the location for at least a specified window (e.g., greater than L [0-30] minutes). For Proximity to Special Location, locations can include (but are not limited to): police stations, courthouses, and/or hospitals. The alert can be triggered when the participant is in or near one of these locations without scheduled movement for a prolonged period of time. Alerts can also flag proximity to known associates, where the participant is near other participants defined as known associates (such as co-assailants that the court prohibits contact with) for a specified window.

Curfew alerts flag movement that is substantially outside of the home area when a participant does not have movement scheduled. A buffer of X(150-2500) feet (more if signal strength is not high) from the home address and a grace period of Y(15-720) minutes can account for drift. This alert is only generated when both the GPS and the RF suggest the participant is out of home. Over time, the buffer can be adjusted by looking at how far the GPS can drift while the RF still says the participant is home.

Incorrect location alerts help to verify movement when the participant has approved movement but goes elsewhere, allowing the system to replace some burdensome movement verification tasks. These alerts can fall into one of three types, (a) Did Not Enter Approved Location, where the participant did not enter the approved location, or spent very little time (less than Z %[5%-95%] of movement window) at the approved location; (b) Outside Travel Corridor, where the participant is outside a general travel corridor between their home and the approved movement location for a specified window (i.e., greater than X[30-720] minutes), where the corridor can include less generous distance tolerance when the travel is in the opposite direction of the destination; and (c) Loitering, where the participant is loitering in an unapproved location for a specified window (i.e., greater than an hour).

Any alert for a high-priority participant should be high priority. For lower priority participants, these alerts should be high priority:

- AWOL
  - Device Tamper (Multiple Tampers, or No Movement Detected)
  - Dying Battery (Battery Critical Escalated)
  - Prolonged Signal Loss (greater than one hour and home RF tripped)
- Proximity to Crime
- Proximity to Special Locations: Police Stations
- Incorrect Locations/Curfew (greater than X [0.5-12] hours)
- Warrants and Re-incarcerations Other than predetermined high priority alerts, a participant's pattern of behavior can be used to determine prioritization. If a participant triggers an alert but the alert does not warrant immediate investigation, it is suggested to aggregate the participant's alert history to determine default prioritization. This ensures repeat offenders do not slip through the cracks; a participant would be higher up on this list if they have more violations, more warnings signed, and/or more alerts in the past week (excluding those deemed false by EM staff).

Figure 5:
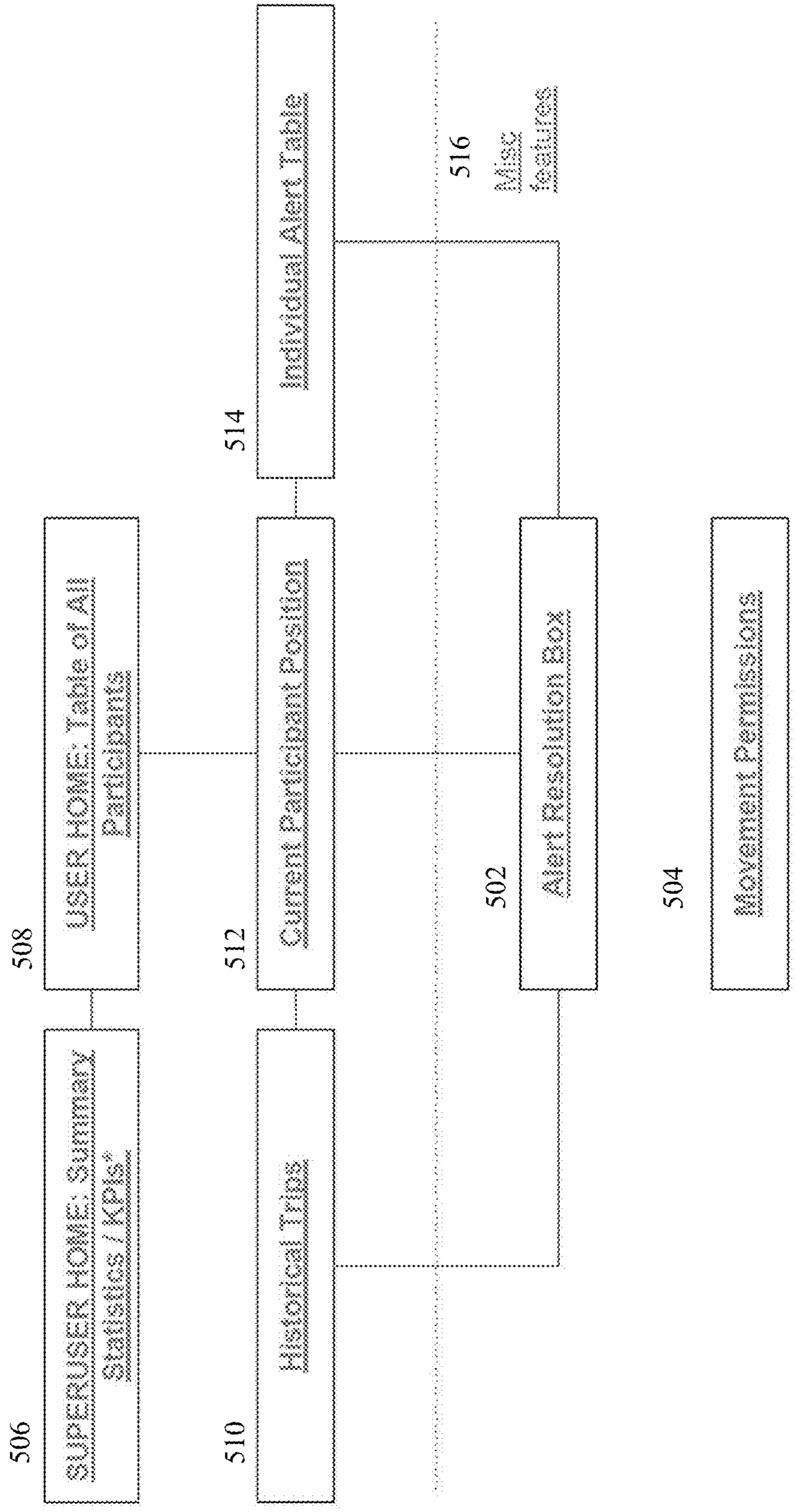
FIG. 5 is an exemplary data structure, according to embodiments of the present disclosure.

FIG. 5 is an exemplary data structure 500 for handling alerts, according to embodiments of the present disclosure. In a Superuser Home 506, summary statistics and KPIs are displayed, according to user preference. The set of predefined Superusers can be able to extend superuser privileges to others. Superusers should access the Superuser Home 506 to view statistics including (a) number of alerts by date generated; (b) number of alert by date resolved; (c) number of alerts resolved by specific user, with rolling average by date resolved; (d) average lag between date generated and date resolved, rolling average by date resolved; (e) what percentage of participants account for what percentage of alerts; (f) a breakdown by type of alert; and (g) loiter per zip code or per police area. In the User Home 508, the user can select a participant and view associated Historical Trips 510, Current Participant Position 512, Individual Alert Table 514, and an Alert Resolution Box 502. The user can also view the participant's Movement Positions 504. The User Home 508 contains up-to-date data on (a) participants in the GPS program; (b) all alerts, current and historical, the participant has triggered; (c) accompanying details (e.g., indicator for a gun charge, administrative high priority status, time of last alert, indicator for whether the participant has had an unresolved alert); and (d) ordering of personnel by priority according to a default prioritization scheme set by customized algorithms. From this page, the user can filter and sort by combining different table columns, with default ordering returned to upon refresh. Information presented can also include how many alerts the participant has had in a streak of bad behavior, date of enrollment, and a filter for permissions related trips.

The Current Participant Position 512 selection can display a map centered around the participant's last-known position, updated in real-time, as indicated by a pulsing indicator with an arrow marker in the direction of participant's movement. If the user hovers over the participant's name, battery level information can also be displayed. In some embodiments, the user can utilize a map's street view function to see where a participant is or has been. The user can see all previous participant positions since participant has last left home address, indicated in lower opacity with arrow markers pointing in the direction of participant's movement at the time. User can click on any position for associated timestamp, address, places at the address (e.g., businesses pulled from Google), nature of alert (e.g., curfew, loiter), authorization (e.g., home, work, court), and other details.

User can also observe icons on map that indicate participant's home address, other authorized address (e.g., work), unauthorized addresses participant loitered at, and any crime or shot reports in proximity of participant. A user can also mark if they have previously loitered at this location, within last seven days or a set period of time and/or set number of alerts. User can navigate a sidebar in Current Participant Position that and, via clicking links, (a) call participant via phone number (popup shows number, gives call options), (b) resolve the alert via an Alert Resolution Box, (c) access participants' Historical Trips that contain similar maps to Current Participant Position but for alerts in the past, (d) access participants Individual Alert Table.

When the user selects the Alert Resolution Box 502, user is prompted to provide a Yes/No response on the following questions:

a. "False Alarm?", (If yes, options: location approved wrong, geocode error, enrolled/re-enrolled/new release, . . . "
b. "Participant Contacted?"
c. "Participant Given Warning?" (if answer to "False Alarm?" is "No")
d. "Participant requires dispatch?" (if answer to "False Alarm?" is "No")
e. "Participant requires re-incarceration?" (if answer to "False Alarm?" is "No")
f. At hospital?
g. Arrested? Participant committed new crime?
h. AWOL? Popup for strap tamper/case tamper/out of the county
i. Add loiter location to the list of approved locations User is also prompted to enter free text into a "Case Notes" field. Questions should be added or removed easily after deployment by superusers.

Upon selecting Historical Trips 510, user lands on the most recent alert map (excluding any current alert, which will be in Current Participant Position) containing all participants between a departure from and return to home address that book-end an alert position, with arrow markers as per Current Participant Position. The user can interact with an animation feature in a corner of the page that the user can press play, rewind, fast forward, or otherwise interact with a slider of the participant's position. Animation triggers a pulsing indicator over cued arrow markers, allowing users to observe playback of participant's movement. The animation feature also allows for modification of speed of playback, defaulting to ~2 positions per second. User can navigate through all entries from Protocol logs feed in Historical Trips 510. The user can also click on previous and next alert maps in sidebar of Historical Trips page to cycle through history of participant's alerts in reverse chronological order. User can see how this past alert was resolved with the answers to questions in Alert Resolution Box 502.

In Individual Alert Table 514, user can browse the entire history of a participant's alerts in a table ordered in reverse chronological order that describes: (a) home departure and return times that book-end alert positions; (b) alert type and details (e.g., curfew, loiter, whether they had scheduled movement or not); (c) aggregated responses to Alert Resolution Box. The user can read through some individual-level features of the participant in Individual Alert Table 514, including gun charge indicator. User can navigate through all entries from Protocol logs feed in Individual Alert Tables 514.

The user can navigate to the Movement Permissions 504, from any of the individual-level pages. In Movement Permissions 504, user can add or edit existing approved addresses, comprising an Approved Address List (including a primary Home address). The address should be linked to Google's auto-complete function to vet for incorrect addresses. In Movement Permissions 504, user can check days of the week, or specific dates, that the user is allowed to be travelling out of his Home address. Upon selecting any date, user should be prompted to estimate hours of the day (in 30-minute increments) or associate addresses from the Approved Address List, but these are associations are not required for approved movement days/dates. Movement Permissions 504 should also obtain these approved movement addresses and times from external data sources where necessary (e.g., external vendors' APIs). Once any of the above modifications are made in Movement Permissions 504, the relevant individuals' customized alerts should, with minimal latency, incorporate the updated data and auto-resolve if necessary, with an automated entry in Alert Resolution Box 502.

Under the Misc. features 516 page, user can receive notifications that indicate new alerts that update in real-time, linking to Current Participant Position. User can receive notifications on whatever page they are on as long as they are logged in. Users can subscribe to particular notifications only (e.g., CPD users would subscribe only to Crime Match notifications). User can access a version of site optimized for mobile, or an app—particularly the Current Participant Position 512, notifications elements, and animation features. User can access a version of site on Microsoft Edge, Chrome, Safari, Firefox, and, as best as possible, Internet Explorer. The app is compatible with iPhones and Android. User can log in using SSO authentication in harmony with other organization platforms, where necessary. User can look up where a participant was at a specific time and date in the past, similar to Intellitrack's filter function. In some embodiments, the Misc. features can include demographic data of the participant including but not limited to criminal history, age, known associates, etc.

Key Alerts

Each alert, of any type, can be accompanied with a flag indication pop-up on the display may that directs the user towards additional information associated with the participant. Information associated with the participant can include, but is not limited to, the following.

Proximity to Shot Flag

1) If a participant trace is on a trip (i.e., not at home), is a high-quality fix signal, and is not within X (150-2500) feet of an approved address, it is eligible for a Proximity to Shot Flag.
2) If a shot event meets some criteria (is 'Multiple Gunshots' and not 'Possible Gunfire'), it is eligible for a Proximity to Shot Flag
3) Once an eligible shot event occurs, any participant who has traces within X (25-500) feet and Y (1-30) minutes of the shot location and timestamp meet a preliminary Proximity to Shot Flag.
4) An additional loiter criterion is checked for: if L (0-30) participant trace-minutes are present within a larger radius (Z feet (150-2500) of the shot location in the L*2 minutes immediately preceding the shot timestamp, the criterion is met and a Proximity to Shot Alert is generated and associated with participant and timestamp of last ShotSpotter incident in proximity.

Crime Match Flag

1) If a participant is outside his home geozone and approved geozones and a shot report occurs within X (25-500) feet of his traces in the last Y (1-30) minutes, and optionally (pre-set loiter criterion) if the participant has spent L (0-30) unique minutes in the previous L*2 minutes within Z (150-2500) feet of the shooting, investigators will receive notification of a Crime Match flag.

2) Investigators will upon clicking the notification, see participant's current position relative to the crime, updated with new traces to allow for pursuit, and historical traces in that trip to contextualize the crime match.
3) Crime Match alerts will notify CPD investigators, for example.
4) Investigators resolving this alert will be presented with a customized list of questions, including 'Was Participant Involved in this Crime', 'Did Participant Provide Useful Information on this Crime'.

Curfew Trip Flag

1) If a participant does not have scheduled movement that day and leaves home geozone for >X (15-720) minutes, the participant triggers a Curfew Trip Flag that the investigator sees.
2) If the participant enters an approved address geozone and has not loitered somewhere else prior to this, the Curfew Flag resolves itself. If he enters an approved address geozone and later loiters, the Curfew Flag reappears.
3) Home Change/Deployment Trips are excluded.
4) The investigator is able to see this flag on the Table of All Participants and can click on it to see the trip since its commencement (i.e., going back 30 minutes+), plus pulsing indicator for where the participant is currently if the trip is currently in progress.
5) If a participant returns home and leaves again, another trip begins.

Schedule Noncompliance (Loiter) Flag

1) If a participant does have scheduled movement that day and leaves home geozone for >X (15-720) minutes and loiters for over Y (15-720) minutes in an unapproved area, the participant triggers a Schedule Noncompliance Trip Flag.
2) Not deployed yet: If a participant completes a trip on a day with scheduled movement and did not enter an approved address at all, the participant triggers a Schedule Noncompliance Trip Flag.
3) Home Change/Deployment Trips are excluded.
4) The investigator is able to see this flag on the Table of All Participants and can click on it to see the trip since its commencement, plus a pulsing indicator for where the participant is currently if the trip is currently in progress.
5) The investigator is able to see whether the participant has a court order for this movement (in which case his locations do not to be specifically approved).
6) If participant returns home and leaves again, another trip begins.

Device Alerts

No Location Flag

1) If an Active participant has not had a trace of high/medium fix quality (or registered being within a beacon) for over H (12-72) hours, the investigator will see a 'No Location Since [Last Datetime of High/Med/Beacon Trace' flag.
2) If the participant's last trace was outside his home geozone, this No Location Flag will be accompanied with an AWOL Risk Flag and will rise to the top of the Table of All Participants.
3) Not deployed yet: Investigator can click on No Location Flag and see the participant's last high quality trace and last trip taken.

Detachment Flag

1) If participant trace has a Strap Disconnect or Case Tamper (as per DeviceEventType field), participant will trigger a Detachment Flag with an associated Detachment Datetime (Start) and Detachment Datetime (End). Investigator will see this Detachment Flag register in real-time. An AWOL Risk flag will accompany the Detachment Flag.
2) If the subsequent trace also has a Strap Disconnect or Case Tamper, the Detachment Datetime (End) will update to the datetime stamp of the subsequent trace and this trace will be associated with the Detachment Flag. If any subsequent trace feature neither Strap Disconnect nor Case Tamper, the Detachment Datetime (End) remains the last trace that feature Strap Disconnect or Case Tamper.
3) If participant traces after Detachment Datetime (End) feature a Strap Connection, Charger Connection, or Charger Detachment, the Detachment Flag will change to a Strap Disconnection Flag. The AWOL Risk flag will resolve to No AWOL Risk.
4) If at least X (1-30) participant traces and Y % (5%-100%) of traces after Detachment Datetime (End) have the accelerometer Movement, the Detachment Flag will change to a Strap Disconnection Flag. The AWOL Risk flag will resolve to No AWOL Risk.
5) Detachments with Detachment Datetime (Start) within a deployment window (first Z hours since first trace of participant) are excluded.
6) If a participant is in a hospital or police station (or in Hospital or Arrest status), AWOL Risk flag will resolve to No AWOL Risk.

Sleep Mode Flag

1) If a participant enters Sleep Mode (Sleep Mode indicator=TRUE when previous trace Sleep Mode indicator=FALSE), he will trigger a Sleep Mode Flag accompanied by an AWOL Risk flag. The Sleep Mode Flag will have an associated Sleep Datetime (Start) and Sleep Datetime (End) that are initialized by the datetime stamp of the Sleep Mode trace.
2) If the subsequent trace also has Sleep Mode, the Sleep Datetime (End) will update to the datetime stamp of the subsequent trace and this trace will be associated with the Sleep Mode Flag. If any subsequent trace does not have a Sleep Mode indicator, the Sleep Datetime (End) remains the last continuous trace where Sleep Mode=TRUE.
3) If a participant has charged the device since entering Sleep Mode, AWOL Risk flag will resolve to No AWOL Risk.
4) If a participant is in a hospital or police station (or in Hospital or Arrest status), AWOL Risk flag will resolve to No AWOL Risk.

Poor Signal Flag

1) If, over the last H (12-72) hours, the participant has had more than X (5-500) distinct approximate coordinates for Low-Quality (non-GPS) traces, after removal of traces within Y (250-2500) feet of their home geozone or other approved geozones, the participant will trigger a Poor Signal Flag.
2) If the participant's last trace was outside his home geozone, this Poor Signal Flag will be accompanied with an AWOL Risk Flag and will rise to the top of the Table of All Participants.
3) Poor Signal Flag within a deployment window (first X hours since first trace) are excluded.

Intermediate Scenarios

Within Home Status and Trips

Inputs: Participant-Traces with Fix Quality, Time, Location: Participant-Updates with Home Address Outputs: Participant-Traces with Within Home Status, Participant Trips With Trip Duration Scenarios:

1. Discard Low Fix Quality participant-traces (Within Home Status set to missing).
2. If participant-trace is of High Fix Quality and within X (250-2500) feet of last updated home address, participant-trace's Within Home Status=True.
3. If participant-trace is of Medium Fix Quality and within Y (X>Y, 500-2500) feet of last updated home address, participant-trace's Within Home Status=True.
5. For participant-trace that is the earliest to have Within Home Status=False, start a Trip Count for participant initialized to 1. For every subsequent participant-trace that is Within Home Status=False, group with same Trip Count=1. For the next participant-trace that is Within Home Status=True, end grouping of traces with Trip Count=1. For subsequent traces of Within Home Status=True.
   a. For the next participant-trace that has Within Home Status=False, up the Trip Count by 1 and assign to all subsequent traces of Within Home Status=False.
   b. Trip has Trip Duration=Sum of all traces with the same Trip Count thus far.
   c. Designate the first trace before a trip and the last trace after a trip, both of Within Home Status=True, as 'anchor' point to be included in trip mapping (assign Trip Count).
6. If participant-traces are within X1 (X1>X2, 1500-5000) feet and greater than X2(500-2500) feet of last updated Home Address for a period of Y (4-24) continuous hours in the first Z (12-168) hours of the participant-trace history, adjust Home Address geocode to center of those participant-trace locations and create FYI notification (not alert) of Home Address Change for staff.

Does Not Enter Approved Address Flag

Inputs: Participant-Traces with Time, Location and Trip Counts: Participant-Updates with Approved Addresses, Global Approved Addresses Outputs: Participant-Trips with Does Not Enter Approved Address Flag, Participant-Traces with Outside Approved Address Status Scenarios:

1. If participant-trace with an associated trip number and has Within Home Status=False, it is checked against all past Approved Addresses associated with participant or global Approved Addresses. If distance>X (150-2500) feet, participant-trace has Outside Approved Address Status=False, else True.
2. For all participant-traces belonging to same Trip Count, calculate the minimum value of Outside Approved Status. If this minimum value is above a threshold of T (1-720) minutes, then Participant-Trip has Does Not Enter Approved Address Flag=False, else True. Deployment Trip Home Change Status Inputs: Participant-Traces with Time, Location and Trip Counts and Durations: Participant-Updates with Home Address Outputs: Participant-Trips with Deployment Trip or Home Change Status.

Scenarios:

1. If participant trace is the earliest participant trace and an associated Trip Count (i.e., Within Home Status=False), this trip will have Deployment Trip Status=True.
   a. If the Trip Duration>X (1-8) hours, Deployment Trip Status=False.
2. If participant update registers a home change, the first participant trace afterwards with Within Home Status=False will have Home Change Status=True.
   a. If the Trip Duration>X (1-8) hours, Home Change Status=False.
3. Participant will be tagged with 'Possible Home Change' on Decision Aid for K (1-24) hours after Deployment Trip or Home Change Trip begins.
4. Trips subsequent to the Deployment Trip (i.e., that commence after Deployment Trip has ended) will have Deployment Trip Status=False.
5. Trips subsequent to the Home Change Trip (i.e., that commence after Home Change Trip has ended) will have Home Change Status=False, unless another Home Address comes in through participant updates.

Note: Deployment Trip/Home Change Trips will be excluded from Curfew or Loiter Trip Alerts.

Loitering Indicator and Instances

Inputs: Participant-Traces with Time, Location (Coordinates & Address), Within Home Status, Trip Count, Outside Approved Address Status: Participant-Trips with Does Not Enter Approved Address Flag, Deployment/Home Change Status.

Parameters: Loiter Time Threshold T (15-720) minutes, Distance Threshold D (500-5000) feet, Return Window=2*Loiter Time Threshold.

Outputs: Participant-Traces with Loitering Indicator, Loiter Instance Counts & Modal Address Scenarios:

1) If participant-trace has a Within Home Status=False, Outside Approved Address Status=True, and belongs to a Trip that has Deployment/Home Change Status=False, it is eligible for loiter calculation
2) For each eligible participant-traces, create a spatial buffer and a return window with which you will compare every other eligible participant-trace of the same Trip Count.
   a) For each eligible participant-trace, sum the number of unique minutes associated with other eligible participant-traces if they are both in the spatial buffer and return window.
   b) If the sum of unique minutes>T minutes, then participant-trace is a Central Loiter Point.
   c) If participant-trace is a Central Loiter Point or is intersection of Central Loiter Points with spatial buffer & return window, its Loitering Indicator=True, else False.
3) Sequence Loiter Instance Counts as you did Trip Counts, but with Loitering Indicator instead of Within Home Status
   a) Loiter Instance Count=1 and subsequent traces with Loitering Indicator=True are grouped with it. Loitering Instance missing for first subsequent trace that has Loitering Indicator=False, up Loitering Instance Count by 1 and group subsequent traces with Loitering Indicator=True with it. Loiter Instance Count will have an associated Loiter Instance Duration that is the sum of unique minutes of all participant traces with the same Loiter Instance Count.
   b) Obtain Modal Address of Loitering Instance and identify earliest timestamp at the Modal Address within that Loiter Instance Count for Marking on eventual Curfew/Schedule Noncompliance map. Display with Modal Address, Loiter Instance Count, earliest time of Loiter Instance Count.

4) Trips that contain traces with Loitering Indicator=True will have Contains Loitering=True.

Active Status

Inputs: Participant Updates with Start Dates, End Dates, Vendor

Outputs: Participant Updates with Active Status (T/F)

Scenarios:

1. If participant update has End Date>=Start Date, participant's Active Status=False.
2. If participant update has Vendor!='GPS' (e.g., CEL, RF), participant's Active Status=False.
3. If participant update has Vendor GPS & Start Date<End Date, participant's Active Status=True.

Figure 6:
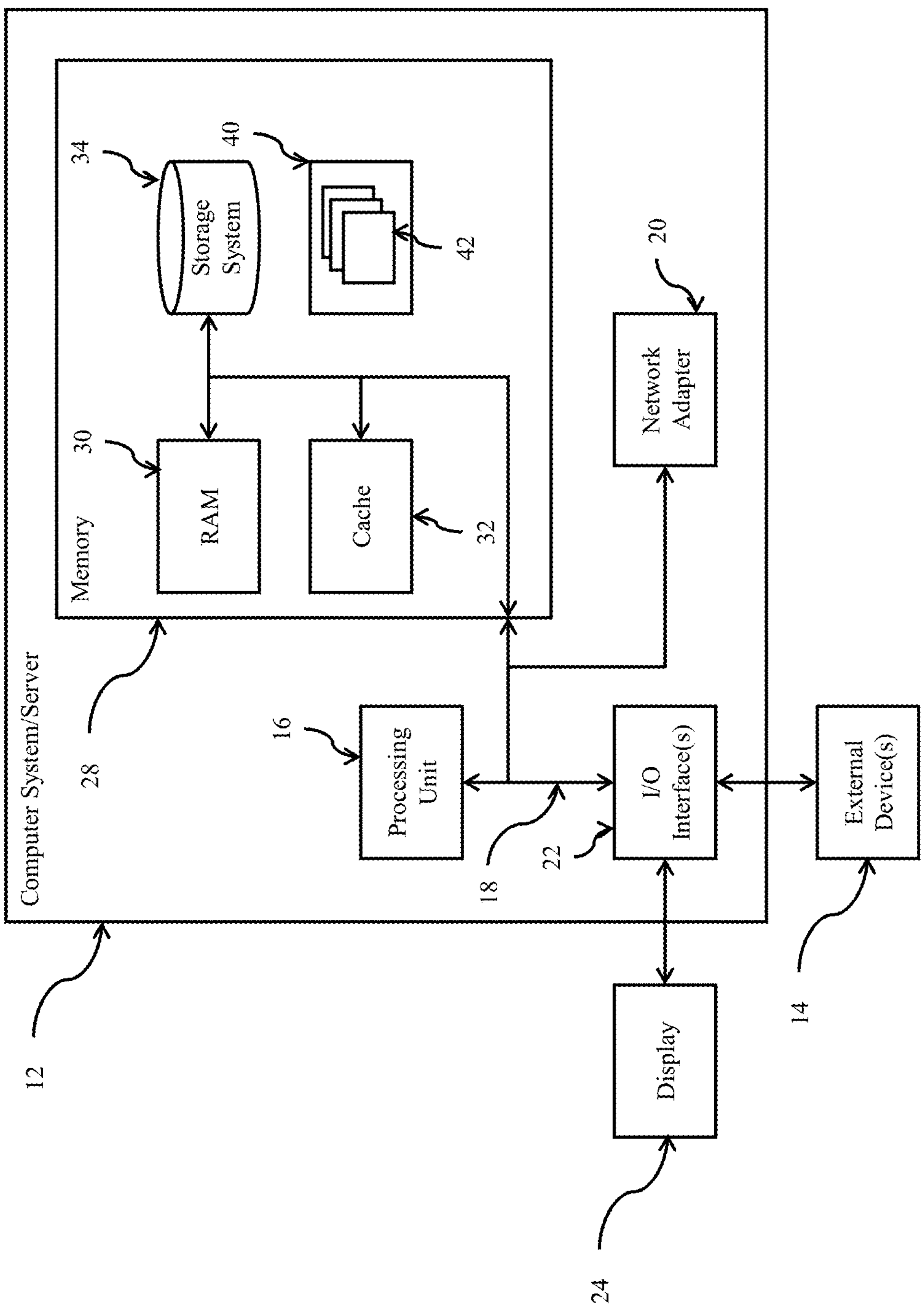
FIG. 6 is an exemplary computing node, according to embodiments of the present disclosure.

Referring now to FIG. 6, a schematic of an example of a computing node is shown. Computing node 600 is only one example of a suitable computing node and is not intended to suggest any limitation as to the scope of use or functionality of embodiments described herein. Regardless, computing node 600 is capable of being implemented and/or performing any of the functionality set forth hereinabove.

In computing node 600 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 600 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Definitions

Offenders: a participant in the program, who is subject to GPS and/or RF tracking.

Traces: a GPS and/or RF tracking map of an offender’s movements.

Inclusion Zone: zone where participant is authorized to move freely without generating an alert.

Starting Point: starting point of a participant's movement along a predetermined trip, where the trip is authorized.

Trip: movement between a starting point and an end point where the participant moves along the predetermined allowed route.

End Point: a final location of a trip or the participant's final destination within an authorized zone.

Alerts:
- Schedule Noncompliance Alert: >X(15-720) minutes spent in an unapproved location during an approved trip.
- Curfew Trip Alert: >X(15-720) minutes spent outside of an approved location.
- Shooting Alert: when a location/time of a participant coincides with a shooting.
- Crime Alert: when a location/time of a participant coincides with a crime.
- AWOL Alerts:
  - Device Tampering Alerts:
    - Disconnect Alert: less serious
      - Disconnected/Reconnected
      - Accelerometer moving
    - Tampering Alert: more serious
      - Stays disconnected
      - Accelerometer not moving
    - Deceased Alert:
      - Stays connected
      - No movement
    - Battery Alert
      - Sleep Mode Alert
  - AWOL Risk
    - Approved GeoZone: lower level risk, as participant may not have service in this area.
    - Unapproved GeoZone: higher level risk.
- GeoZones
  - Exclusion zones
    - Schools
    - Restraining orders
  - Approved zones
    - Home GeoZone
    - Work GeoZone
    - Public transportation
  - GeoZone of Interest
    - Hospitals
    - Police Station
- Movements
  - Trips.
    - Approved Trip
    - Unapproved Trips/Curfew Trips

What is claimed is:

1. A method, comprising:

receiving a location of a participant, the participant subject to active electronic monitoring by an electronic monitoring agency;

receiving data associated with the location of the participant;

determining an alert level for the participant based on the data and the location of the participant;

based on the alert level of the participant, determining a priority level for the participant;

ranking the participant based on the priority level; and alerting the electronic monitoring agency to investigate the participant, based on rank.

2. The method of claim 1, further comprising generating an alert for the participant whose alert is above a threshold level.

3. The method of claim 1, further comprising:

receiving a set of participant characteristics, the set comprising at least one authorized location, at least one unauthorized location, and a schedule; and adjusting the alert level based on the set of participant characteristics; and transmitting the adjusted alert level to a user.

4. The method of claim 3, wherein the at least one authorized location is a home address.

5. The method of claim 3, wherein the schedule is a preapproved day-to-day schedule.

6. The method of claim 1, wherein the location of the participant is a global position system (GPS) location or a radio-frequency (RF) location.

7. The method of claim 1, further comprising generating a map of the location of the participant and a representation of the data associated with the location of the participant.

8. The method of claim 7, wherein the representation of the data comprises one or more of an indication of at least one of a location of a crime scene, an area of public safety interest, and a location of a reported shot fired.

9. The method of claim 7, further comprising:

receiving demographic data associated with the participant; and displaying a representation of the demographic data on the map.

10. The method of claim 7, wherein the map comprises an inclusion zone associated with the participant.

11. The method of claim 1, further comprising:

receiving a contact history for the participant;

adjusting the alert level based on the contact history; and prompting a user to contact the participant based on the adjusted alert level.

12. The method of claim 1, wherein the data associated with the location of the participant comprises one or more of local crime data, reported shots fired, and historical crime data.

13. The method of claim 1, further comprising:

receiving a start point and an end point for the participant;

generating a trip from the start point to the end point for the participant;

based on the location of the participant, determining a deviation of the participant from the trip; and adjusting the alert level based on the deviation of the participant.

14. The method of claim 1, further comprising:

receiving an alert level history for the participant; and transmitting the alert level history to a user.

15. The method of claim 14, wherein the alert level history includes a resolution log associated with the participant.

16. The method of claim 15, wherein the resolution log includes one or more alert details and a resolution associated with the one or more alert details.

17. The method of claim 16, wherein the one or more alert details comprise an alert type.

18. The method of claim 1, further comprising:

receiving information associated with the participant; and based on the information associated with the participant, determining the threshold level.

19. The method of claim 1, wherein the alert level is one of low, medium, or high.

20. A system, comprising:

a computing node comprising a computer readable storage medium having program instructions embodied therewith, the program instructions executable by a processor of the computing node to cause the processor to perform a method comprising:

receiving a location of a participant, the participant subject to active electronic monitoring by an electronic monitoring agency;

receiving data associated with the location of the participant;

determining an alert level for the participant based on the data and the location of the participant;

based on the alert level of the participant, determining a priority level for the participant; and ranking the participant based on the priority level; and alerting the electronic monitoring agency to investigate the participant, based on rank.

21. A computer program product, comprising a non-transitory computer readable storage medium having program instructions embodied therewith, the program instructions executable by a processor to cause the processor to perform a method comprising:

receiving a location of a participant, the participant subject to active electronic monitoring by an electronic monitoring agency;

receiving data associated with the location of the participant;

determining an alert level for the participant based on the data and the location of the participant;

based on the alert level of the participant, determining a priority level for the participant; and ranking the participant based on the priority level; and alerting the electronic monitoring agency to investigate the participant, based on rank.

* * * * *